United States Patent
Ashiya et al.

(10) Patent No.: US 10,382,431 B2
(45) Date of Patent: Aug. 13, 2019

(54) NETWORK HOP COUNT NETWORK LOCATION IDENTIFIER

(71) Applicant: CA, Inc., New York, NY (US)

(72) Inventors: Himanshu Ashiya, Karnataka (IN); Atmaram Shetye, Mapusa (IN); Roshan Mathews, Tamil Nadu (IN)

(73) Assignee: CA, Inc., New York, NY (US)

( * ) Notice: Subject to any disclaimer, the term of this patent is extended or adjusted under 35 U.S.C. 154(b) by 208 days.

(21) Appl. No.: 15/448,802

(22) Filed: Mar. 3, 2017

(65) Prior Publication Data
US 2018/0255041 A1    Sep. 6, 2018

(51) Int. Cl.
*H04L 29/06*   (2006.01)
*H04L 9/32*    (2006.01)

(52) U.S. Cl.
CPC .......... *H04L 63/083* (2013.01); *H04L 9/3247* (2013.01); *H04L 63/102* (2013.01)

(58) Field of Classification Search
None
See application file for complete search history.

(56) References Cited

U.S. PATENT DOCUMENTS

| | | | | |
|---|---|---|---|---|
| 9,602,338 B2* | 3/2017 | Zhang | ............... | H04L 43/0858 |
| 9,602,482 B1* | 3/2017 | Roth | ............... | H04L 63/08 |
| 2003/0101338 A1* | 5/2003 | Mullen | ............... | H04L 63/0236 |
| | | | | 713/152 |
| 2007/0174630 A1* | 7/2007 | Shannon | ............... | G06F 21/31 |
| | | | | 713/183 |
| 2010/0106966 A1* | 4/2010 | Santos | ............... | H04L 12/66 |
| | | | | 713/156 |
| 2011/0096665 A1* | 4/2011 | McCann | ............... | H04L 47/10 |
| | | | | 370/235 |
| 2011/0295890 A1* | 12/2011 | Gracieux | ............... | H04L 43/062 |
| | | | | 707/770 |
| 2015/0012752 A1* | 1/2015 | Priyadarshi | ............... | G06F 21/44 |
| | | | | 713/176 |
| 2015/0180755 A1* | 6/2015 | Zhang | ............... | H04L 43/0858 |
| | | | | 370/244 |
| 2018/0020324 A1* | 1/2018 | Beauford | ............... | H04W 4/021 |

(Continued)

OTHER PUBLICATIONS

Related U.S. Appl. No. 15/448,844; entitled "Hop Latency Network Location Identifier," filed Mar. 3, 2017 by Himanshu Ashiya.

(Continued)

*Primary Examiner* — Jeffery L Williams
(74) *Attorney, Agent, or Firm* — Meyertons, Hood, Kivlin, Kowert & Goetzel, P.C.

(57) ABSTRACT

Identifying a communication source includes receiving a message from a client computer requesting access to a computer-based resource; and receiving, a network signature from the client computer, wherein the network-related signature comprises a value representing how many routing devices are on a network path between the client computer and a predetermined computer. Also included is determining whether the vector of values matches a vector of stored values, each stored value potentially corresponding to a respective one of the values in the vector of values; and limiting access to the computer-based resource based at least in part on the vector of values not matching the vector of stored values.

20 Claims, 4 Drawing Sheets

(56) References Cited

U.S. PATENT DOCUMENTS

2018/0060560 A1* 3/2018 Waltermann ............ G06F 21/44
2018/0255042 A1* 9/2018 Ashiya .................. H04L 63/083

OTHER PUBLICATIONS

TelcoNotes; "How to Troubleshoot High Latency with Traceroute Command;" https://telconotes.wordpress.com/2014/03/07/how-to-troubleshoot-high-latency-with-traceroute-command/; Mar. 7, 2014.

* cited by examiner

NETWORK HOP COUNT NETWORK LOCATION IDENTIFIER

RELATED APPLICATIONS

The present application is related to U.S. patent application Ser. No. 15/448,844 entitled HOP LATENCY NETWORK LOCATION IDENTIFIER filed concurrently herewith, the disclosure of which is incorporated by reference herein in their entirety.

BACKGROUND

The present disclosure relates to identifying network locations and, more specifically, to using a hop count to identify a network location.

Enterprises can include a number of computer-based resources that are accessible via a network. Thus, remotely located users can still access those computer-based resources when desired. One concern for the enterprise is to ensure that access to the computer-based resources is granted in a manner that is secure and in compliance with enterprise policies and rules. Thus, there is conventionally a login gateway or access control server that the remote users communicate with to gain access to the enterprise's resources. Typically, the user of a remote system would supply identification credentials such as a user name and a password. The login gateway would be configured to authenticate the identity of the user based on the supplied credentials. For certain transactions, the login gateway may prompt the user for additional credentials such as personal identification numbers (PINs) or answers to one or more predetermined questions.

BRIEF SUMMARY

An aspect of the present disclosure relates to a method identifying a communication source that includes receiving, by a processor, a message comprising data related to a request from a client device to access a computer-based resource; and receiving, by the processor, a network-related signature from the client device, wherein the network-related signature comprises a value representing how many routing devices are on a network path between the client device and a predetermined computer. The method also includes determining, by the processor, whether the value matches a stored value; and limiting, by the processor, access to the computer-based resource based at least in part on the value not matching the stored value.

An additional aspect of the present disclosure relates to a system for identifying a communication source that includes a memory device storing executable code and a processor in communication with the memory device. In particular, the executable code, when executed by the processor, causes the processor to receive a message comprising data related to a request from a client computer to access a computer-based resource; and receive a network-related signature from the client computer, wherein the network-related signature comprises a value representing how many routing devices are on a network path between the client computer and a predetermined computer. The processor also determines whether the value matches a stored value; provides access to the computer-based resource based at least in part on the value matching the stored value; and limits access to the computer-based resource based at least in part on the value not matching the stored value.

Yet another aspect of the present disclosure relates to a non-transitory computer-readable medium having instructions stored thereon that are executable by a computing device to perform operations comprising: a) receiving a message comprising data related to a request from a client computer to access a computer-based resource; b) receiving a network-related signature from the client computer, wherein the network-related signature comprises a value representing how many routing devices are on a network path between the client computer and a static network location; c) retrieving a stored value representing how many routing devices were calculated to be on the network path between the client computer and the static network location for a previous request from the client computer to access the computer-based resource; d) determining whether the value matches the stored value; e) providing access to the computer-based resource based at least in part on the value matching the stored value; and f) limiting access to the computer-based resource based at least in part on the value not matching the stored value.

BRIEF DESCRIPTION OF THE DRAWINGS

Aspects of the present disclosure are illustrated by way of example and are not limited by the accompanying figures with like references indicating like elements.

DETAILED DESCRIPTION

Figure 1:
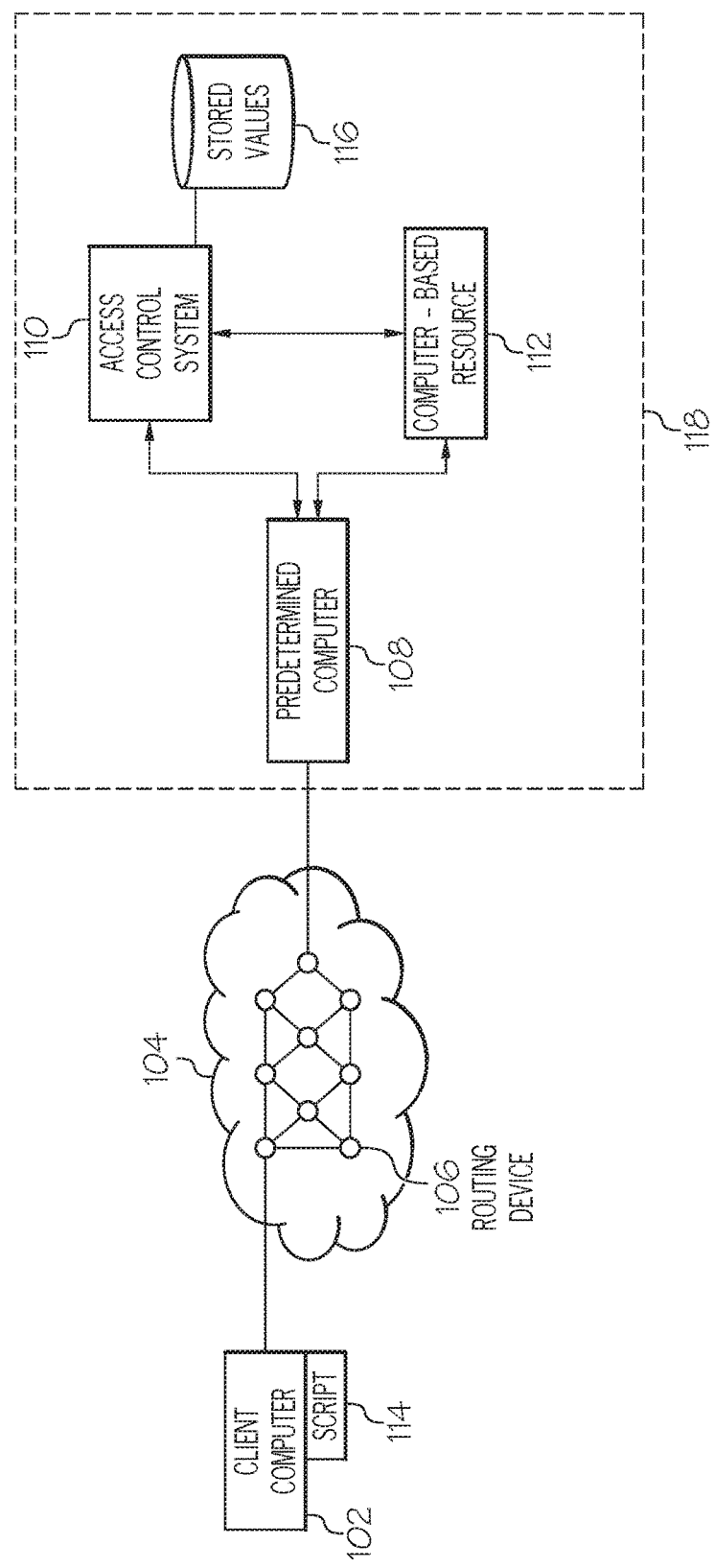
FIG. 1 depicts a block diagram of an example environment in which a communication source may be identified in accordance with the principles of the present disclosure.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely as hardware, entirely as software (including firmware, resident software, micro-code, etc.) or by combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random-access memory (RAM), a read-only memory (ROM), an erasable programmable read-only memory (EPROM or Flash memory), an appropriate optical fiber with a repeater, a portable compact disc read-only memory (CORaM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object-oriented programming language such as JAVA, SCALA, SMALLTALK, EIFFEL, JADE, EMERALD, C++, CII, VB.NET, PYTHON or the like, conventional procedural programming languages, such as the "C" programming language, VISUAL BASIC, FORTRAN 2003, PERL, COBOL 2002, PHP, ABAP, dynamic programming languages such as PYTHON, RUBY and GROOVY, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

FIG. 1 depicts a block diagram of an example environment in which a communication source may be identified in accordance with the principles of the present disclosure. A computer-based resource 112 of an enterprise 118 is accessible to a client computer 102 via a network 104. For example, the enterprise 118 may be a business that allows employees and contractors to remotely access the computer-based resource 112. The computer-based resource 112 may, for example, include various servers providing different application software, various cloud-based services, one or more web-based servers, and a plurality of different databases.

There is typically an access control system 110 that manages granting access to remote users such as those using the client computer 102. Conventionally, when a user first tries to access the computer-based resource 112, the user will supply credentials such as a username and password to establish their identity. The exchange of the credential information can be made more secure, for example, by using encryption within the communication messages or using one-time passwords that are short-lived.

Between the client computer 102 and the enterprise 118 is the network 104 which includes a plurality of routing devices 106 that determine how packets from the client computer 102 are forwarded through the network 104 to be delivered to the predetermined computer 108. The sequence of routing devices 106 through which a packet travels is considered to be the network path from the client computer 102 to the predetermined computer 108. In an Internet Protocol (IP) network, for example, the routing devices 106 cooperatively communicate so that new paths can be implemented if one of the routing devices 106 were to fail. However, absent such a failure, the network path between the client computer 102 and the predetermined computer 108 remains relatively stable and the same for many days and weeks in a row as long as the predetermined computer 118 is in a static network location such as, for example, having assigned to it a static IP address. As is the case in many instances, the client computer 102 may have a dynamic IP address that changes each time the client computer connects with their Internet Service Provider (ISP) network. However, even though the IP address of the client computer 102 can vary, the network path between the client computer 102 and the predetermined computer 108 remains relatively stable and the same for many days and weeks in a row as long as the predetermined computer 108 is in a static network location. Thus, in accordance with the principles of the present disclosure, information about the network path is determined (i.e., a network-related signature) and used to represent a physical location of a client computer.

In FIG. 1, merely by way of example, the predetermined computer 108 is depicted as acting like a gateway to the computers, resources and systems within the enterprise 118. One of ordinary skill will recognize that the predetermined computer 108 does not need to be located as shown in FIG. 1 and does not even need to be in communication with the access control system 110 or the computer-based resource 112. For purposes of the present disclosure, what should remain relatively stable is the network path through the network 104 from the client computer 102 and the predetermined computer 108.

One concern for the enterprise 118 of FIG. 1 is to ensure that access to the computer-based resource 112 is granted in a manner that is secure and in compliance with enterprise policies and rules. For example, the access control system 110 of the enterprise 118 may grant remote users access only if they are using a previously-identified and approved client computer 102. The access control system 110 of the enterprise 118 may grant remote users access only if their client computer is located at a previously-approved geographical location (e.g., a home office, a remote office, etc.). Alternatively, instead of blocking access to the computer-based resource, the access control system 110 may initiate additional security procedures when the location of the client computer 102 cannot be identified or is not at an approved location. An "approved" location may, for example, be the previous location where the client computer 102 was located when it most-recently accessed the computer-based resource 112.

Thus, in the current technological environment in which users and their associated devices are generally mobile, embodiments in accordance with the present disclosure provide a technology-based solution to improve the manner in which the access control system 110 operates when providing secure access to the computer-based resource 112. As described below, the access control system, in addition to conventional credential verification techniques, relies on a network signature of the network path between the client computer 102 and the predetermined computer 108 to control access to the computer-based resource 112. Thus, the granting of access to resources can be based not merely on an identity of a user or client computer but also the location of the client computer as compared to a previous location of the client computer.

Figure 2:
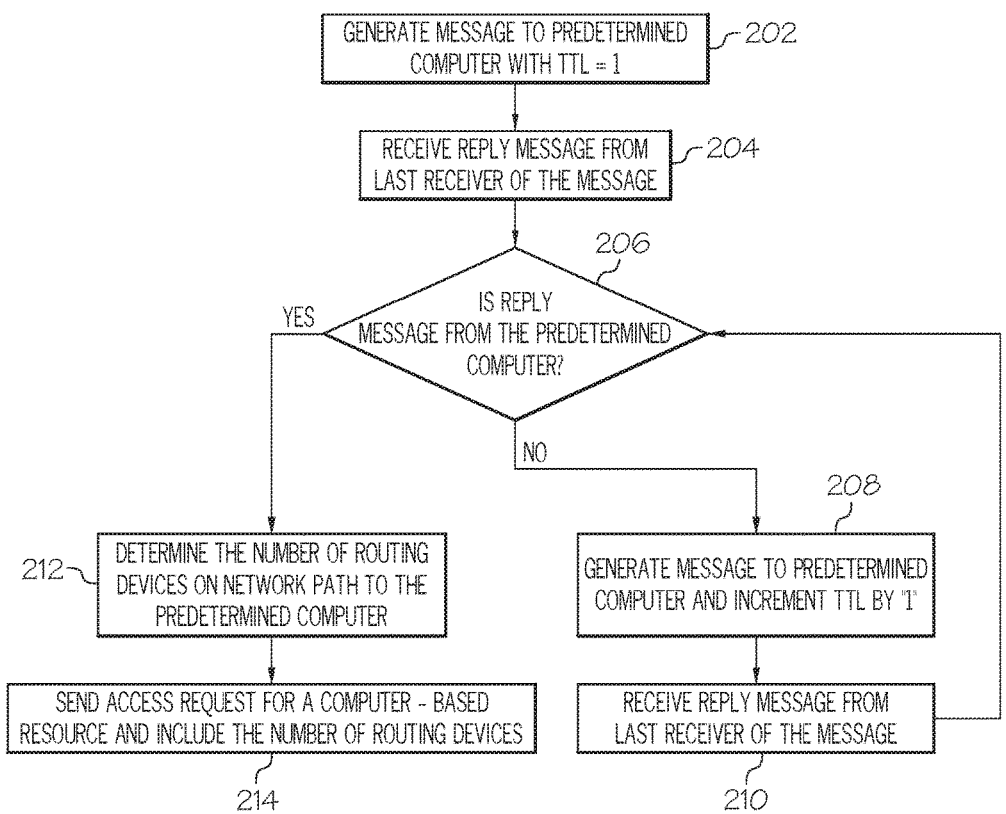
FIG. 2 is a flowchart of an example method of determining a network signature in accordance with the principles of the present disclosure.

A script, application, or other executable instructions 114 may execute on the client computer and determine the network signature through the network 104. FIG. 2 is a flowchart of an example method of determining a network signature in accordance with the principles of the present disclosure.

In step 202, the executable instructions (hereinafter, "the script 114") generate an outgoing network message that has its "time-to-live" (TTL) field set equal to a value of "1" and a destination address of the predetermined computer 108. The outgoing network message can, for example, be a user datagram protocol (UDP) packet/datagram with its port field set to some value which is unlikely being listened to at the predetermined computer 108. Alternatively, the outgoing message can be an internet control message protocol (ICMP) message such as an ICMP echo message. The outgoing network message has its source address set to that of the client computer 102 so that any network messages generated as a result of the outgoing network message can be delivered to the client computer 102.

In an IP-based network, routing devices 106 are configured such that if they encounter a network message/packet/datagram with a TTL=0 or TTL=1, then the message is dropped and an ICMP "time-exceeded" reply message is sent to the sender (i.e., client computer 102). If TTL>1, then the routing device 106 decrements the TTL field by "1" and forwards the message towards the predetermined computer 108 according to the information in the routing device's forwarding table. Accordingly, for the outgoing message sent in step 202, the first routing device 106 along the network path will generate that reply ICMP message to the client computer 102. Thus, in step 204, the last receiver of the message is the first routing device 106 of the network path between the client computer 102 and the predetermined computer 108. Such a network path can be referred to as having 1 "hop".

In addition to merely sending out the outgoing message, the script 114 can start a timer when the outgoing message is sent and stop that timer when the reply message from the last receiver of the message is received by the client computer 102. In this way, a round trip transit time between the client computer 102 and the sender of the reply message can be calculated. This round trip transit time can be referred to as "latency". The "latency" of a hop typically refers to the latency between two adjacent routing devices. Thus, a first latency can be the round trip transit time between the client computer 102 and a $n^{th}$ routing device while a second latency can be the round trip transit time between the client computer 102 and the $(n+1)^{th}$ routing device. The latency between the two routing devices is then based on the difference between the second latency and the first latency.

In step 206, the script makes a determination as to whether the reply message was sent from the predetermined computer 108. If so, then the signature of the network path can be determined. If not, then another outgoing message will need to be generated and sent. If the outgoing message is an ICMP echo message, then when it reaches the predetermined computer 108, the predetermined computer sends an ICMP "reply" message (unlike the routing devices 106 along the network path that send ICMP "time exceeded" messages.) If the outgoing message is a UDP-based datagram, then the predetermined computer 108 replies with ICMP "port unreachable" message (or some ICMP message other than "time exceeded").

Assuming, in step 206, that the reply message is not from the predetermined computer 108, the script in step 208, will generate another outgoing message to the predetermined computer 108 and increment the value in the TTL field of the previous outgoing message by "1". This time the outgoing packet will be forwarded by the first routing device 106 in the network path (because TTL=2) and will be dropped by the second routing device 106 in the network path. The second routing device 106 sends the ICMP "time exceeded" message which is received in step 210. Similar, to the first outgoing message, a timer can be used to determine the latency between the client computer 102 and the second routing device 106.

Steps 206, 208 and 210 iterate through and each iteration travels one routing device further through the network path between the client computer 102 and the predetermined computer 108. Ultimately, in step 206, the reply message is received from the predetermined computer 108. At step 212, the script 114 determines the network signature of the network path by determining the number of routing devices on the network path between the client computer 102 and the predetermined computer 108.

The script 114 can be a preliminary step in a login process to access the computer-based resource 112. Thus, as part of the login request, or access request, that is sent from the client computer 102 to the access control system 110, the client computer 102 can include the network signature information, in step 214. One example would be if a user of the client computer 102 uses a web browser to reach a login web page served by the access control system 110. When the login web page loads in the user's browser or when the user fills and the web page fields and sends it back to the access control system 110, the script could be executed that determines the network signature information. That network signature information could then be included in the information transmitted back to the access control system 110 along with the information in the fields of the login web page (e.g., username and password). The script within the web page could, for example, be a JAVA applet or could call a separate program or script that determines the network signature information.

If, for example, the predetermined computer 108 has an IP address of (206.66.12.202), then the method of FIG. 2 could be executed three times in a row to generate the following information at the client computer 102 as shown in the table below.

| HOP NUMBER | IP ADDRESS | ROUND TRIP TIME 1 | ROUND TRIP TIME 2 | ROUND TRIP TIME 3 | AVERAGE ROUND TRIP TIME (ms) |
|---|---|---|---|---|---|
| 1 | (208.225.64.50) | 4.867 ms | 4.893 ms | 3.449 ms | 4.403 |
| 2 | (157.130.0.17) | 6.918 ms | 8.721 ms | 16.476 ms | 10.705 |
| 3 | (146.188.176.38) | 6.323 ms | 6.123 ms | 7.011 ms | 6.486 |
| 4 | (146.188.176.82) | 6.955 ms | 15.400 ms | 6.684 ms | 9.680 |
| 5 | (146.188.136.245) | 49.105 ms | 49.921 ms | 47.371 ms | 48.800 |
| 6 | (146.188.240.77) | 48.162 ms | 48.052 ms | 47.565 ms | 47.926 |
| 7 | (146.188.240.45) | 47.886 ms | 47.380 ms | 50.690 ms | 48.652 |
| 8 | (137.39.138.74) | 69.827 ms | 68.112 ms | 66.859 ms | 68.266 |
| 9 | (206.66.12.202) | 174.853 ms | 163.945 ms | 147.501 ms | 162.010 |

30

Because the ninth hop is the predetermined computer 108, the number of routing devices 106 in the network path between the client computer 102 and the predetermined computer 108 is "8". Thus, the client computer 102 could include "8" within the access request sent to the access control system 110 or it could include "9" if the access control system 110 was programmed to interpret that value correctly. The round trip times in each column are shown, in this example, as a difference between the round trip time for the current hop and the round trip time for the previous hop. In other words, the example round trip time for hop "7" is the difference between a) the round trip transit time between the client computer 102 and the $7^{th}$ routing device and b) the round trip transit time between the client computer 102 and the $6^{th}$ routing device.

In some instances, some of the routing devices 106 on the network path may not be configured properly to send back an expected reply message. When that happens, the client computer determines a time-out has happened but the predetermined computer 108 has still not been reached. Thus, following a timed-out outgoing message, a new outgoing message is generated having an incremented TTL value and sent towards the predetermined computer 108. In the above table, however, there will be missing data for that routing device. The unresponsive routing device will still be recognized as one hop along the network path, however.

Figure 3:
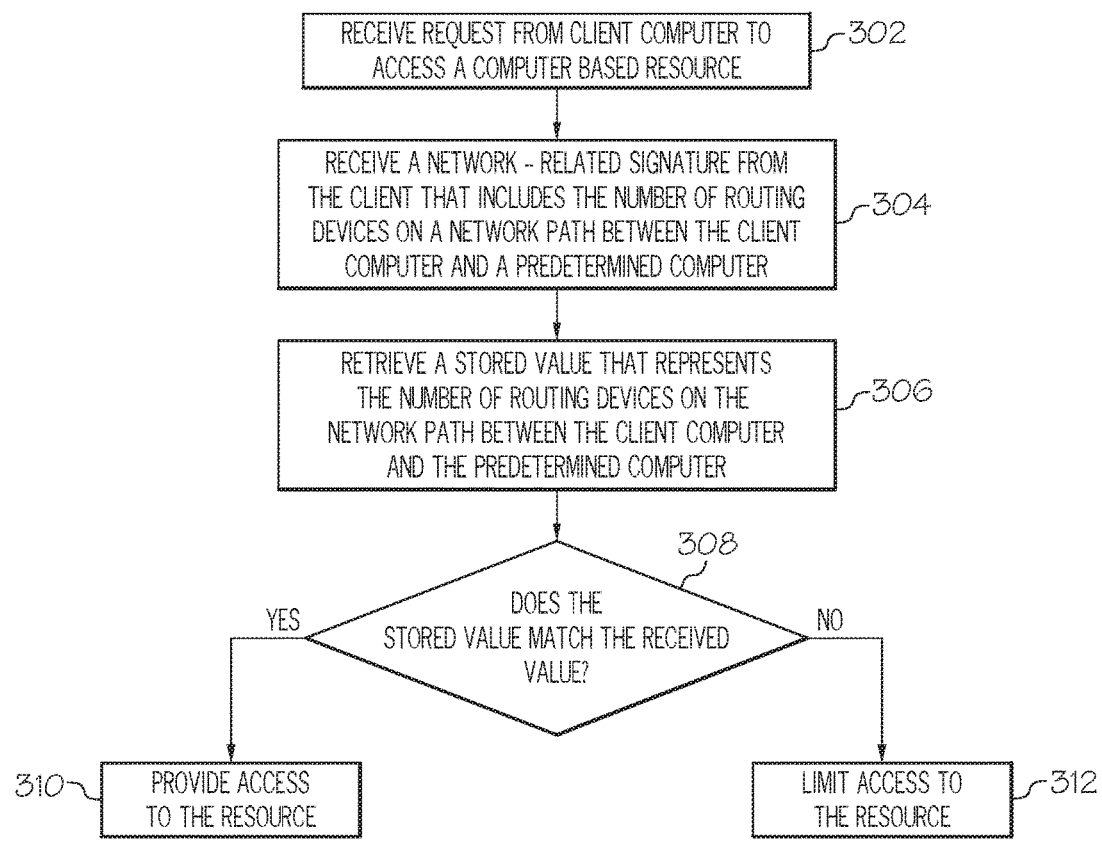
FIG. 3 is a flowchart of an example method of analyzing a network signature in accordance with the principles of the present disclosure.

FIG. 3 is a flowchart of an example method of analyzing a network signature in accordance with the principles of the present disclosure. In step 302, the access control system 110, for example can receive a request from the client computer 102 for access to the computer-based resource 112. Within that access request, or as part of a multistep credential verification process, the access control system 110 receives, in step 304, a network-related signature from the client computer 102. As discussed above, the network-related signature can include the number of routing devices on the network path between the client computer 102 and the predetermined computer 108.

The access request received in step 302 will typically include identification information or credentials for a user of the client computer 102 that is attempting to access the computer-based resource 112. Additionally, the access control system has access to a database 116 (See FIG. 1) that stores network-related signatures that have previously been associated with a user identity or a client computer identity. Thus, in step 306, the access control system 110 can use the identification information in the received access request to retrieve a network-related signature from the database 116 associated with a particular user or client computer 102. The retrieved network-related signature is a previously determined value for the number of routing devices on the network path between the client computer 102 and the predetermined computer.

In step 308, a determination is made as to whether the retrieved network-related signature stored in the database 116 matches the network-related signature that is part of the received access request. Even though the number of routing devices on the network path between the client computer 102 and the predetermined computer 108 will be an integer, the value stored in the database 116 for a particular client computer 102 may not necessarily be an integer. For example, if each time the client computer sends a calculated network-related signature, that value is averaged into the currently stored value for that particular client computer 102, then the stored value in the database 116 may become a non-integer. Accordingly, a "match" can include a range such that if the received network-related signature is "8", then it would match any stored value within the range of "7.5" to "8.5".

If there is no match, then, in step 312, the access control system 110 limits the access granted to the computer-based resource 112. Limiting access may include terminating a login process entirely or limiting access to only predetermined portions of the computer-based resource 112 (e.g., particular database tables, particular files or folders, particular applications or commands, etc.). Limiting access could also include the access control system 110 asking for additional identification information to verify. For example, additional security questions or additional pin codes could be used to verify the identification of the user even though the network-related signature did not match the stored value in database 116.

If there is a match, then the access control system 110, in step 310 can grant access to the computer based resource 112. As mentioned above, the access control system 110 can also modify the value stored in the database 116 based on the most recently received network-related signature. For example, the access control system 110 can track how many network-related signatures have been received from a particular client computer 102 and store an averaged value representing all of those network-related signatures. Alternatively, the network-related signature stored value in database 116 can simply be replaced by the most recently received network-related signature value for a particular client computer 102 (or user). The replacement of the stored signatures can be accomplished as a journal such that historical values of the stored network-related signature can be maintained. As for storing an initial value in the database 116, the first x network-related signatures may be used to calculate the initial stored value. Thus, upon receiving the x+1 network-related signature, the access control system 110 can start implementing the identity verification method of FIG. 3. Similarly, if the enterprise 118 determines that the static location of the predetermined computer 108 changes or that a new predetermined computer is selected, then old information from the database 116 can be purged and new initial values can be calculated and stored.

Figure 4:
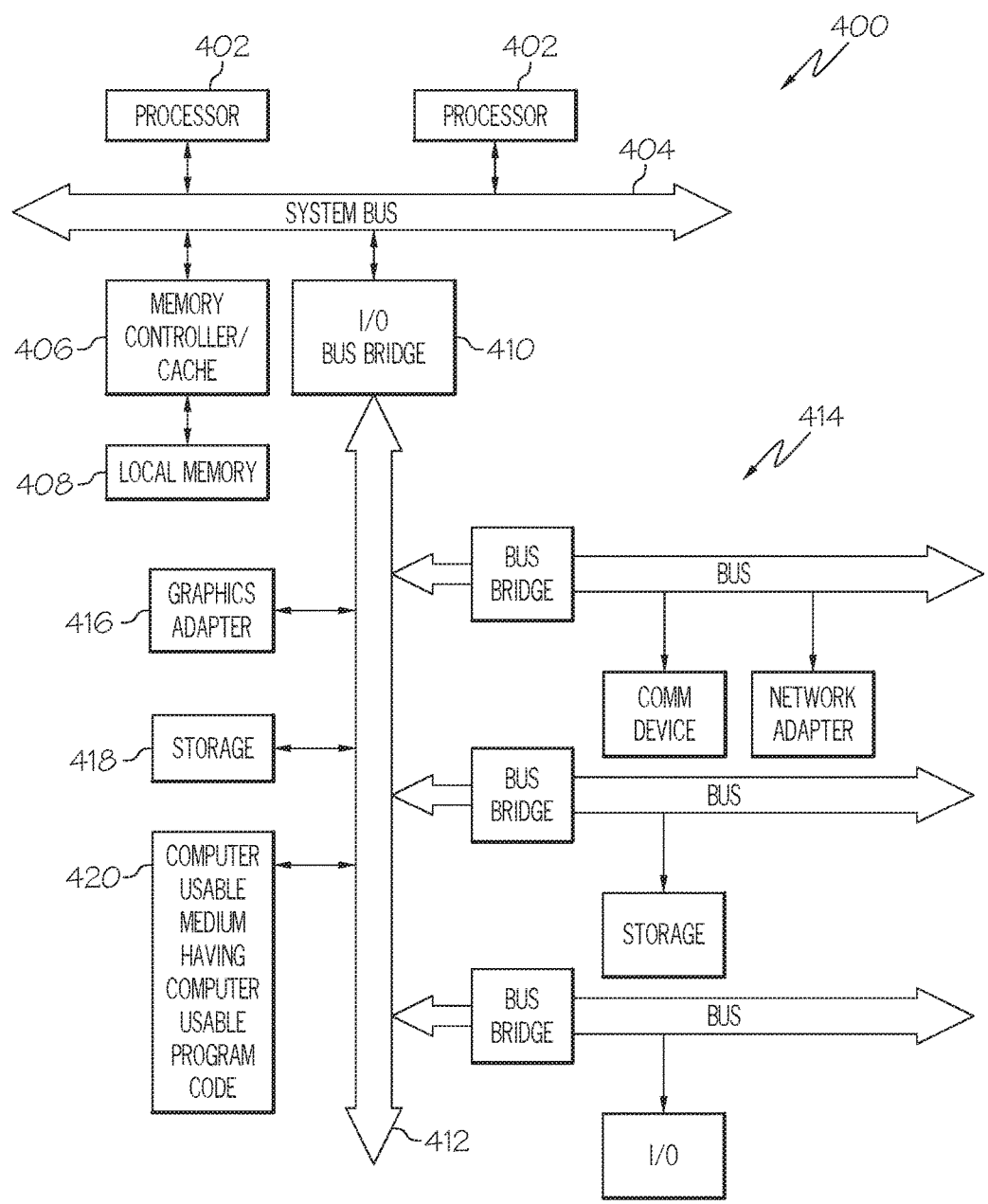
FIG. 4 is a block diagram of a data processing system in accordance with the principles of the present disclosure.

FIG. 4 is a block diagram of a data processing system in accordance with the principles of the present disclosure.

Referring to FIG. 4, a block diagram of a data processing system is depicted in accordance with the present disclosure. A data processing system 400, such as may be utilized to implement the hardware platform 102 or aspects thereof, e.g., as set out in greater detail in FIG. 1-FIG. 3, may comprise a symmetric multiprocessor (SMP) system or other configuration including a plurality of processors 402 connected to system bus 404. Alternatively, a single processor 402 may be employed. Also connected to system bus 404 is memory controller/cache 406, which provides an interface to local memory 408. An I/O bridge 410 is connected to the system bus 404 and provides an interface to an I/O bus 412. The I/O bus may be utilized to support one or more buses and corresponding devices 414, such as bus bridges, input output devices (I/O devices), storage, network adapters, etc. Network adapters may also be coupled to the system to enable the data processing system to become coupled to other data processing systems or remote printers or storage devices through intervening private or public networks.

Also connected to the I/O bus may be devices such as a graphics adapter 416, storage 418 and a computer usable storage medium 420 having computer usable program code embodied thereon. The computer usable program code may be executed to execute any aspect of the present disclosure, for example, to implement aspect of any of the methods, computer program products and/or system components illustrated in FIG. 1-FIG. 3.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A method, comprising:
   receiving, by a server system from a client device, a request to access a computer-based resource;
   receiving, by the server system, a network-related signature from the client device, wherein the network-related signature specifies a particular value representing a number of routing devices on a network path between the client device and a predetermined computer;
   determining, by the server system, whether to provide the client device with access to the computer-based resource, including by:
      accessing network-related signature information indicative of previous access attempts by the client device, wherein the network-related signature information includes an average value of the number of routing devices on the network path between the client device and the predetermined computer during a plurality of the previous access attempts; and
      comparing the particular value to the average value; and
   limiting, by the server system, access to the computer-based resource in response to the particular value exceeding a particular range from the average value.

2. The method of claim 1, wherein the network-related signature is included in the request to access the computer-based resource.

3. The method of claim 1, further comprising:
   associating, by the server system, the average value with an identity of a user of the client device.

4. The method of claim 1, wherein the request includes data indicative of an identity of a user of the client device, the method further comprising:
   verifying, by the server system, the identity of the user based on the comparing the particular value to the average value.

5. The method of claim 1, further comprising:
sending, by the server system, a login page to the client device, wherein the request is sent by the client device in response to a user completing the login page; and
wherein the login page includes executable code that, when executed, determines the number of routing devices on the network path between the client device and the predetermined computer.

6. The method of claim 5, wherein the executable code comprises an executable script within a web page.

7. A system, comprising:
at least one processor; and
a non-transitory, computer-readable medium having instructions stored thereon that are executable by the at least one processor to cause the system to:
receive a request from a client computer to access a computer-based resource;
receive a network-related signature from the client computer, wherein the network-related signature specifies a particular value representing a number of routing devices on a network path between the client computer and a predetermined computer;
determine whether to provide the client computer with access to the computer-based resource, including by:
accessing network-related signature information indicative of previous access attempts by the client computer, wherein the network-related signature information includes an average value of the number of routing devices on the network path between the client computer and the predetermined computer during a plurality of the previous access attempts; and
comparing the particular value to the average value;
provide the client computer with access to the computer-based resource in response to the particular value matching the average value within a particular threshold; and
limit access, by the client computer, to the computer-based resource in response to the particular value not matching the average value within the particular threshold.

8. The system of claim 7, wherein the request to access the computer-based resource includes the network-related signature.

9. The system of claim 7, wherein the instructions are further executable by the at least one processor to cause the system to:
associate the average value with an identity of a user of the client computer.

10. The system of claim 7, wherein the request includes data indicative of an identity of a user of the client computer, wherein the instructions are further executable by the at least one processor to cause the system to:
verify the identity of the user based on the comparing the particular value and the average value.

11. The system of claim 7, wherein the instructions are further executable by the at least one processor to cause the system to:
send a login page to the client computer, wherein the request is sent by the client computer in response to a user completing the login page; and
wherein the login page includes executable code that, when executed, determines the number of routing devices on the network path between the client computer and the predetermined computer.

12. A non-transitory, computer-readable medium having instructions stored thereon that are executable by a server system to perform operations comprising:
receiving a request from a client computer to access a computer-based resource;
receiving a network-related signature from the client computer, wherein the network-related signature specifies a particular value representing a number of routing devices on a network path between the client computer and a static network location;
determining whether to provide the client computer with access to the computer-based resource, including by:
accessing network-related signature information indicative of previous access attempts by the client computer, wherein the network-related signature information includes an average value of the number of routing devices calculated to be on the network path between the client computer and the static network location during a plurality of the previous access attempts; and
comparing the particular value to the average value;
providing access to the computer-based resource in response to the particular value matching the average value within a particular range; and
limiting access to the computer-based resource in response to the particular value not matching the average value within the particular range.

13. The method of claim 1, wherein the server system is the predetermined computer.

14. The method of claim 1, wherein determining whether to provide the client device with access to the computer-based resource further includes verifying one or more authentication credentials provided by the client device.

15. The method of claim 1, wherein limiting access to the computer-based resource includes initiating additional security operations for the client device.

16. The method of claim 1, further comprising:
updating the average value based on the particular value.

17. The method of claim 1, wherein the plurality of the previous access attempts is a most-recent subset of the previous access attempts by the client device.

18. The non-transitory, computer-readable medium of claim 12, wherein determining whether to provide the client computer with access to the computer-based resource further includes verifying one or more authentication credentials provided by the client computer.

19. The non-transitory, computer-readable medium of claim 12, wherein limiting access to the computer-based resource includes denying the client computer access to the computer-based resource.

20. The non-transitory, computer-readable medium of claim 12, wherein the average value is calculated based on a most-recent subset of the previous access attempts by the client computer.

* * * * *